(12) United States Patent
Wang et al.

(10) Patent No.: US 11,180,325 B2
(45) Date of Patent: Nov. 23, 2021

(54) LIFTING DEVICE AND OPERATING METHOD THEREOF

(71) Applicants: HEFEI BOE DISPLAY TECHNOLOGY CO., LTD., Anhui (CN); BOE TECHNOLOGY GROUP CO., LTD., Beijing (CN)

(72) Inventors: Can Wang, Beijing (CN); Tianzhu Chen, Beijing (CN); Yu Liu, Beijing (CN); Liuzhu Chen, Beijing (CN)

(73) Assignees: HEFEI BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 363 days.

(21) Appl. No.: 16/327,512

(22) PCT Filed: Jul. 24, 2018

(86) PCT No.: PCT/CN2018/096765
§ 371 (c)(1),
(2) Date: Feb. 22, 2019

(87) PCT Pub. No.: WO2019/062300
PCT Pub. Date: Apr. 4, 2019

(65) Prior Publication Data
US 2020/0231412 A1 Jul. 23, 2020

(30) Foreign Application Priority Data
Sep. 28, 2017 (CN) .......................... 201721263352.1

(51) Int. Cl.
*B65G 1/04* (2006.01)
*B65G 47/57* (2006.01)
(Continued)

(52) U.S. Cl.
CPC ............... *B65G 47/57* (2013.01); *B65G 1/04* (2013.01); *B65G 1/127* (2013.01);
(Continued)

(58) Field of Classification Search
CPC ........ B65G 1/04; B65G 1/0407; B65G 47/57; B66B 11/043; B66B 11/026; B66B 11/04
(Continued)

(56) References Cited

U.S. PATENT DOCUMENTS 4,998,856 A * 3/1991 LaBarre .................. E04H 6/282
414/240
5,362,192 A * 11/1994 Dang .................... B65G 1/0435
198/468.2
(Continued)

FOREIGN PATENT DOCUMENTS

| CN | 201923666 U | 8/2011 |
|----|-------------|--------|
| CN | 105863334 A | 8/2016 |

(Continued)

OTHER PUBLICATIONS

International Search Report and Written Opinion for International Appl. No. PCT/CN2018/096765, dated Oct. 26, 2018.

*Primary Examiner* — Douglas A Hess
(74) *Attorney, Agent, or Firm* — The Webb Law Firm

(57) ABSTRACT

This disclosure provides a lifting device, comprising: guide rails extending through a plurality of floors in vertical direction, a lift car frame that is liftably connected to the guide rails, a tray that is detachably connected to the lift car frame, a tray circulation assembly that is mounted on each floor, the tray being detachably connectable to the tray circulation assembly and the tray circulation assembly being used for docking the tray connected thereto on the floor where the tray circulation assembly is mounted or for enabling the tray connected thereto to be connected to the lift (Continued)

car frame. This disclosure further provides a method of operating the lifting device.

18 Claims, 3 Drawing Sheets

(51) Int. Cl.
*B66B 11/04* (2006.01)
*B66B 11/02* (2006.01)
*F16M 13/02* (2006.01)
*B65G 1/127* (2006.01)
*B66B 7/02* (2006.01)

(52) U.S. Cl.
CPC ........ *B66B 11/0226* (2013.01); *B66B 11/043* (2013.01); *F16M 13/022* (2013.01); *B66B 7/02* (2013.01)

(58) Field of Classification Search
USPC ........... 198/463.3, 468.8; 414/277, 280, 281, 414/282, 807
See application file for complete search history.

(56) References Cited

U.S. PATENT DOCUMENTS

| | | | | |
|---|---|---|---|---|
| 5,564,880 | A * | 10/1996 | Lederer | B65G 1/0435 414/280 |
| 5,915,909 | A * | 6/1999 | Smith | B65G 1/0421 414/280 |
| 6,923,612 | B2 * | 8/2005 | Hansl | B65G 1/0435 414/277 |
| 7,784,407 | B2 * | 8/2010 | Di Rosa | B65G 1/0414 104/48 |
| 8,105,005 | B2 * | 1/2012 | Yoshida | H01L 21/67733 414/282 |
| 8,721,251 | B1 * | 5/2014 | Razumov | B65G 1/0492 414/281 |
| 9,631,390 | B2 * | 4/2017 | Segal | B65G 1/06 |
| 9,994,394 | B2 * | 6/2018 | Masuda | B65G 1/0435 |

FOREIGN PATENT DOCUMENTS

| | | |
|---|---|---|
| CN | 205932835 U | 2/2017 |
| DE | 10 2015 114 979 A1 | 3/2017 |
| JP | 06-288111 A | 10/1994 |
| WO | WO-90/00507 A1 | 1/1990 |

* cited by examiner

LIFTING DEVICE AND OPERATING METHOD THEREOF

CROSS-REFERENCE TO RELATED APPLICATIONS

This application is a U.S. National Stage under 35 U.S.C. § 371 of International Application No. PCT/CN2018/096765 as filed on Jul. 24, 2018, which claims priority to Chinese Patent Application No. 201721263352.1, filed on Sep. 28, 2017. The disclosures of each of these applications are hereby incorporated herein by reference in their entirety into this application.

TECHNICAL FIELD

This disclosure relates to a lifting device and an operating method thereof.

BACKGROUND

The lifting device related to this disclosure comprises guide rails and a lift car that is liftably connected to the guide rails. When it is required to be raised or lowered to transport materials to certain floors, the material needs to be placed on the bottom surface inside the lift car. Thereafter, the lift car is raised or lowered and stopped at the target floor and the material is taken out of the lift car. In the related lifting device, the lift car performs the lifting and landing of its own as well as the stopping at each target floor, i.e. the lift car performs all the start and stop.

SUMMARY

One or more embodiments of this disclosure provide the technical solutions as bellow.

A lifting device, comprising:
guide rails extending through a plurality of floors in vertical direction,
a lift car frame that is liftably connected to the guide rails,
a tray that is detachably connected to the lift car frame,
a tray circulation assembly that is mounted on each floor, the tray being detachably connectable to the tray circulation assembly and the tray circulation assembly being used for docking the tray connected thereto on the floor where the tray circulation assembly is mounted or for enabling the tray connected thereto to be connected to the lift car frame.

In one or more embodiments of this disclosure, the tray comprises a tray body and first tray shafts that are retractable and fixed at edges of the tray body. The lift car frame has a frame bracket that is connected to the first tray shafts when the first tray shafts protrude from the tray body, and is disconnected from the first tray shafts when the first tray shafts are retracted toward the tray body.

In one or more embodiments of the disclosure, the tray body includes second tray shafts that are retractable and fixed at the edges of the tray body. The tray circulation assembly includes sprockets and lifting chains that are driven by the sprockets to be raised and lowered, chain brackets are fixed to the lifting chains, the chain brackets are connected to the second tray shafts when the second tray shafts protrude from the tray body, and disconnected from the second tray shafts when the second tray shafts are retracted towards the tray body.

In one or more embodiments of the disclosure, the first tray shafts and the second tray shafts are arranged on different edges of the tray body.

In one or more embodiments of the disclosure, there are two or more first tray shafts fixed on the same edge of the tray body.

In one or more embodiments of the disclosure, there are two or more second tray shafts fixed on the same edge of the tray body.

In one or more embodiments of the disclosure, the first tray shafts and the second tray shafts employ spring-return electromagnetic switches.

In one or more embodiments of the disclosure, the lift car frame and the tray circulation assembly are driven by different electric motor.

In one or more embodiments of the disclosure, the tray body is a square tray body, wherein each of two opposite edges of the square tray body is provided with the first tray shafts, and each of the other two opposite edges of the square tray body is provided with the second tray shafts.

In one or more embodiments of the disclosure, the first tray shafts and the second tray shafts are disposed axially symmetrically respectively about central axis of the square tray body.

In one or more embodiments of the disclosure, the lift car frame is provided with a plurality of layers of frame brackets from bottom to top.

In one or more embodiments of the disclosure, an upper surface of the frame bracket is provided with arced grooves of the frame bracket for positioning the first tray shafts.

In one or more embodiments of the disclosure, an upper surface of the chain bracket is provided with arced grooves of the chain bracket for positioning the second tray shafts.

In one or more embodiments of the disclosure, an upper end of the lifting chain is located between the floor where the tray circulation assembly is mounted and upper floor, and a lower end of the lifting chain is located between the floor where the tray circulation assembly is mounted and lower floor.

One or more embodiments of this disclosure provide the following technical solution.

A method for operating a lifting device, wherein the lifting device comprises guide rails extending through a plurality of floors in vertical direction, a lift car frame that is liftably connected to the guide rails, a tray that is detachably connected to the lift car frame, a tray circulation assembly that is mounted on each floor, the tray being detachably connectable to the tray circulation assembly, the method including the following steps:
before the lift car frame is raised or lowered to the tray circulation assembly, the tray circulation assembly starts to accelerate in the same direction as the lift car frame,
when the tray circulation assembly is level with a height of the tray, the tray is disconnected from the lift car frame and connected to the tray circulation assembly, and the tray circulation assembly docks the tray connected thereto on the floor where the tray circulation assembly is mounted, or the tray is disconnected from the tray circulation assembly and connected to the lift car frame such that the tray is capable of being raised or lowered with the lift car frame.

In one or more embodiments of the disclosure, the lift car frame is raised or lowered at a uniform speed.

In one or more embodiments of the disclosure, an acceleration of the tray circulation assembly during accelerating is constant.

In one or more embodiments of the disclosure, when the tray circulation assembly is level with the height of the tray, the tray circulation assembly has the same speed as the lift car frame.

In one or more embodiments of the disclosure, after the tray circulation assembly is level with the height of the tray, the tray circulation assembly continues to accelerate for a predetermined period of time.

DETAILED DESCRIPTION

The technical solutions in the embodiments of this disclosure are clearly and completely described in the following with reference to the accompanying drawings in the embodiments of the present disclosure. Evidently, the embodiments in the following description are only a part rather than all of the embodiments of this disclosure. Based on the embodiments of this disclosure, all other embodiments obtained by persons of ordinary skill in the art without creative effects shall fall within the protection scope of this disclosure.

Figure 1:
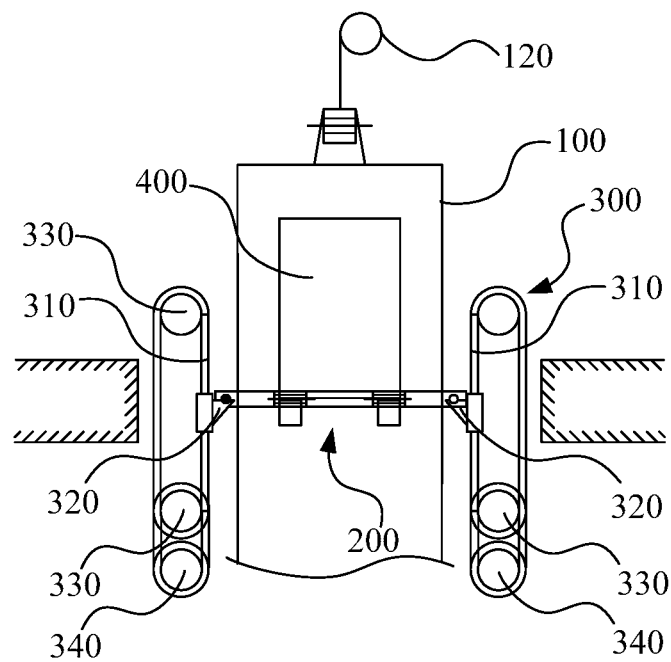
FIG. 1 is a schematic view of a lifting device provided in an embodiment of this disclosure.
Figure 2:
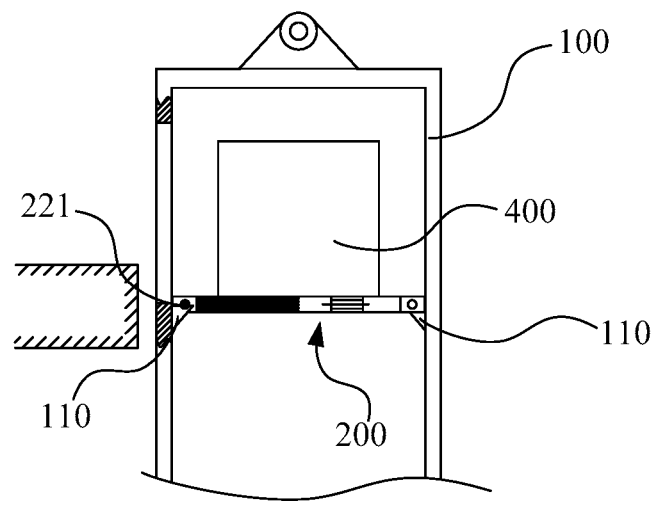
FIG. 2 is a schematic view of the lifting device shown in FIG. 1 viewed from another angle.
Figure 3:
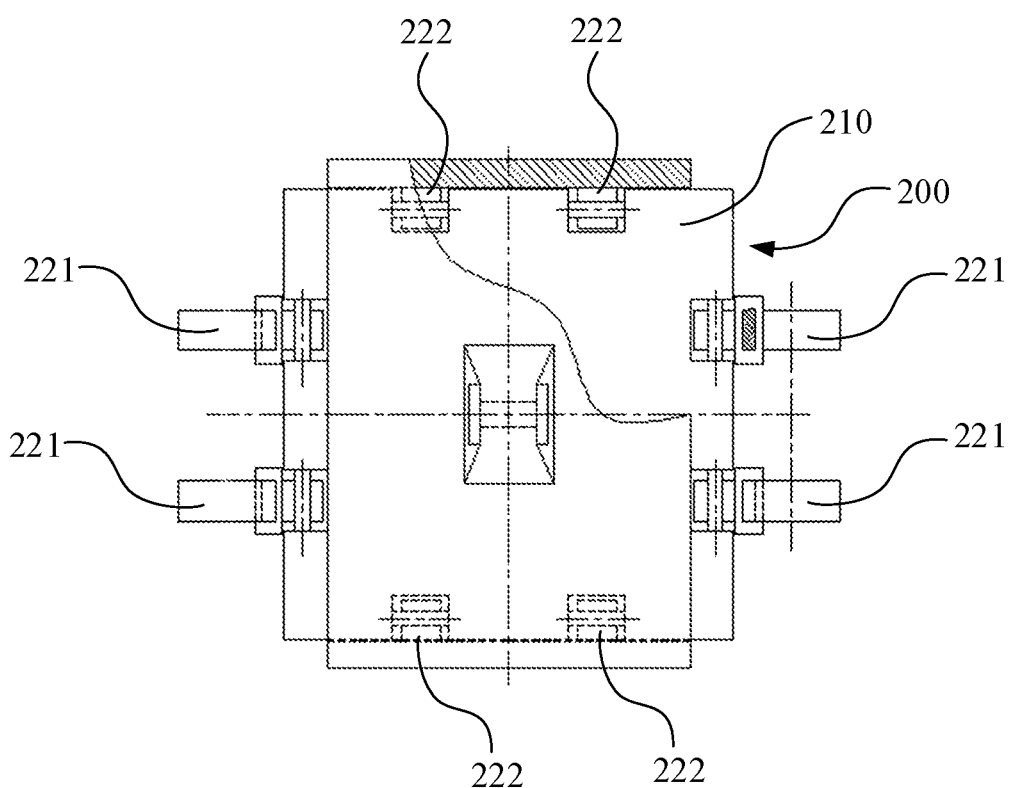
FIG. 3 is a top view of the tray of the lifting device shown in FIG. 1.

An embodiment of this disclosure provides a lifting device. As shown in FIGS. 1, 2 and 3, the lifting device comprising:

guide rails (not shown) extending through a plurality of floors in the vertical direction;

a lift car frame 100 that is liftably connected to the guide rails;

a tray 200, which is detachably connected to the lift car frame 100;

a tray circulation assembly 300 mounted on each floor, the tray 200 being detachably connected to the tray circulation assembly 300 for docking the tray 200 connected thereto on the floor where the tray circulation assembly 300 is mounted.

The lifting device of this embodiment comprises guide rails extending through a plurality of floors in the vertical direction, a lift car frame 100, a tray 200 and a tray circulation assembly 300, wherein the lift car frame 100 is liftably connected to the guide rails, the tray 200 is detachably connected to the lift car frame 100 and is also detachably connected to the tray circulation assembly 300, the tray 200 is used for carrying material 400, and the tray circulation assembly 300 is used for docking the tray 200 connected thereto on the floor where the tray circulation assembly 300 is mounted. Since the tray 200 is detachably connected to the lift car frame 100, the tray 200 is raised or lowered along with the raising or lowering of the lift car frame 100 when the tray 200 is detachably connected to the lift car frame 100. Meanwhile, since the tray 200 is also detachably connected to the tray circulation assembly 300, when the tray 200 is detachably connected to the tray circulation assembly 300 and is separated from the lift car frame 100, the tray 200 and the lift car frame 100 are two independent parts, the lift car frame 100 can be raised and lowered independently, and the tray circulation assembly 300 is used for docking the tray 200 connected thereto on the floor where the tray circulation assembly 300 is mounted. In the lifting device in the related technology, the lift car performs the raising and lowering of its own as well as the docking on each target floor, i.e. the lift car performs all the start and stop and it is in a frequent start and stop state. In contrary, in the lifting device in this embodiment, with the aid of a tray, a lift car frame and a tray circulation assembly that are both detachably connected to the tray, the lift car frame is only responsible for raising and lowering, but not for docking on each target floor any longer, and the tray circulation assembly is only responsible for docking the tray on the floor where the tray circulation assembly is mounted, so that the times for starting and stopping the lift car frame and the individual tray circulation assembly are reduced greatly, thereby improving the service life of lift car frame and tray circulation assembly as well as improving the service life of the lifting device.

The lifting device of this disclosure is able to be raised or lowered to transport material. The raising process for transporting material and the lowering process for transporting material are respectively described as bellow.

The raising process of the lifting device for transport material to the target floor, such as to the third floor, can be as bellow.

First of all, the tray 200 is detachably connected to the lift car frame 100. The lift car frame 100 is raised, and the tray 200 is raised along with the lift car frame 100.

Then, when the lift car frame 100 is raised to the position of the tray circulation assembly 300 mounted in the target floor, the tray 200 is detachably connected to the tray circulation assembly 300. Hereafter, the tray 200 is separated from the lift car frame 100. At this time, the lift car frame 100 continues to be raised, and the tray 200 is detached from the bottom of the lift car frame 100.

Finally, the tray circulation assembly 300 is used to dock the tray 200 connected thereto on the floor where the tray circulation assembly is mounted, and the material carried on the tray 200 is moved to the target floor.

The lowering process of lifting device for transporting material from the floor on which the material is placed, such as the fourth floor, can be as follows.

First of all, the tray 200 is detachably connected to the tray circulation assembly 300 of the floor on which the material is placed, and the lift car frame 100 is lowered.

Then, when the lift car frame 100 is lowered to the position of the tray circulation assembly 300 of the floor on which the material is placed, the tray 200 enters the bottom of the lift car frame 100 and is detachably connected to the lift car frame 100. Hereafter, the tray 200 is separated from the tray circulation assembly 300.

Finally, the tray 200 docks on the bottom floor together with the lift car frame 100, and the material carried on the tray is moved therefrom.

In one or more embodiments of this disclosure, the specific structure of the tray can be the structure as shown in FIGS. 2 and 3. That is, the tray 200 includes a tray body 210 and first tray shafts 221 that are retractable and fixed at the edge of the tray body. The lift car frame 100 has a frame bracket 110 for bearing the first tray shaft in a protruding state.

Here, when the first tray shafts 221 of the tray are in the protruding state, the frame bracket 110 of the lift car frame bears the first tray shafts 221 in the protruding state. When the first tray shafts 221 of the tray are in a retracting state, the frame bracket 110 of the lift car frame does not bear the first tray shafts 221 of the tray, and the lift car frame 100 and the tray 200 are separated from each other. Thus, the detachable connection between the tray 200 and the lift car frame 100 is achieved. The tray 200 and the lift car frame 100 in the aforesaid structure are of simple structure and convenient for manufacturing, they can conveniently achieve the detachable connection and disconnection between the tray 200 and the lift car frame 100, which is advantageous for simplifying the structure of the lifting device.

In one or more embodiments of this disclosure, as illustrated in FIG. 3, second tray shafts 222 that are retractable are fixed at the edges of the tray body, which are not provided with the first tray shafts. In one or more embodiments of this disclosure, the first tray shafts 221 and the second tray shafts 222 are arranged on the same edge of the tray body.

As illustrated in FIG. 1, the tray circulation assembly 300 comprises sprockets 330 and lifting chains 310 that are driven by the sprocket 330 to be raised or lowered, and chain brackets 320 for bearing the second tray shafts in the protruding state is fixed on the lifting chains 310.

Here, when the second tray shafts 222 of the tray are in the protruding state, the chain brackets 320 of the tray circulation assembly bears the second tray shafts 222 in the protruding state. When the second tray shafts 222 of the tray are in the retracting state, the chain brackets 320 of the tray circulation assembly do not bear the second tray shafts 222 and are disconnected from the tray 200. In this way, the detachable connection between the tray 200 and the tray circulation assembly 300 can be realized. The tray 200 and the tray circulation assembly 300 in the aforesaid structure are of simple structure and convenient for manufacturing, and they can conveniently achieve the detachable connection and disconnection between the tray 200 and the tray circulation assembly 300, which is advantageous for simplifying the structure of the lifting device.

In order to enhance the stability of the detachable connection between the tray and the lift car frame and that between the tray and the tray circulation assembly, the first tray shafts which are fixed on the same edge of the tray body can be two or more, and the second tray shafts which are fixed on the same edge of the tray body can be two or more.

In particular, the first tray shafts and the second tray shafts employ a spring-return electromagnetic switch.

In particular, as illustrated in FIG. 3, the tray body 210 is a square tray body. Each of two opposite edges of the square tray body is provided with two first tray shafts 221, and each of the other two opposite edges is provided with the two second tray shafts 222.

The square tray body 210 has a regular shape and is convenient for manufacturing. The aforesaid configuration of the first tray shafts 221 and the second tray shafts 222 prevents interference between these parts when the tray 200 is detachably connected with or disconnected from the lift car frame 100 or the tray circulation assembly 300.

Further, as shown in FIG. 3, the first tray shafts 221 and the second tray shafts 222 are disposed axially symmetrically respectively about the central axis of the square tray body. The square tray body as well the first tray shafts 221 and second tray shafts 222 are arranged in such a way that, when the first tray shafts 221 bear the square tray body and the second tray shafts 222 bear the square tray body, force is applied to the square tray body in a more uniformly manner and the square tray body is carried more stably.

As to the specific structure of the lift car frame, it is provided with a plurality of layers of frame brackets from low layer to high layer. In such a way, the lift car frame can be detachably connected to a plurality of trays at a time and transports a plurality of trays to the target floor from bottom to top at a time.

Figure 4:
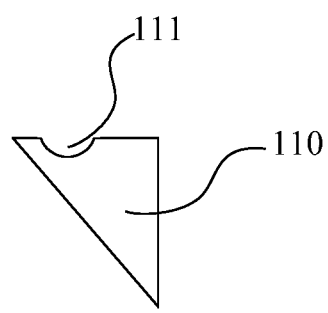
FIG. 4 is a schematic view of the frame bracket of the lifting device as shown in FIG. 1.

In order to make the detachable connection between the tray and the lift car frame more stable when they are connected, as illustrated in FIG. 4, the upper surface of the frame bracket 110 also can be provided with a arced groove 111 of the frame bracket for positioning the first tray shafts. During the detachable connection between the tray 200 and the lift car frame 100, the first tray shafts 221 of the tray are located inside the arced groove 111 of the frame bracket, which can achieve the positioning function and also prevent the first tray shafts 221 of the tray from swinging back and forth, thereby enhancing the stability of the detachable connection between the tray 200 and the lift car frame 100.

Similarly, the upper surface of the chain bracket also can be provided with a arced groove of the chain bracket for positioning the second tray shaft. During the detachable connection between the tray and the tray circulation assembly, the second tray shafts of the tray are located inside the arced groove of the chain bracket, which can achieve the positioning function and also prevent the second tray shafts of the tray from swinging back and forth, thereby enhancing the stability of the detachable connection between the tray and the tray circulation assembly.

In order to achieve the drive of the lift car frame and the drive of the lifting chain, the lift car frame is driven by the drive motor 120 for the lift car frame, and the sprocket is driven by the drive motor 340 for the lifting chain, i.e. the lift car frame and the tray circulation assembly are driven by different motors. The drive motor 120 for the lift car frame is only responsible for driving the lift car frame to be raised and lowered, but not responsible for the stopping at each target floor. The driven motor 340 for lifting chain is only responsible for the stopping at the floor where the lifting chains are provided, so that the times of starting or stopping the drive motor 120 for the lift car frame and the individual drive motor 340 for the lifting chain are greatly reduced, thereby improving the service life of the drive motor 120 for the lift car frame and the individual drive motor 340 for the lifting chain as well as the service life of the lifting device.

As to the arrangement of the lifting chain, the upper end of the lifting chain is located between the floor where the lifting chain is located and the upper floor, and the lower end of the lifting chain is located between the floor where the lifting chain is located and the lower floor.

When the lifting device is raised to transport materials to a target floor, such as to the third floor, the chain brackets 320 for fixing the lifting chains of the target floor is located between the target floor and the lower floor. The raising process of the lifting device for transporting material is described as bellow.

First of all, the frame bracket 110 of the lift car frame 100 bears the first tray shafts 221 protruding from the tray to achieve a detachable connection between the tray 200 and the lift car frame 100, and the tray 200 is raised along with the lift car frame 100 at a speed of $V_0$.

Figure 5:
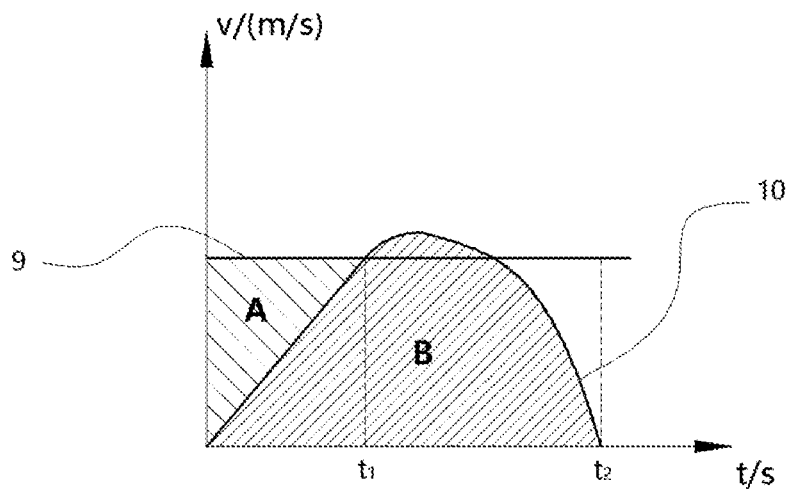
FIG. 5 is a diagram showing the motion relationship of the lifting chain of the lifting device shown in FIG. 1 during the raising process for transporting material.

Then, when the tray 200 is raised to the floor that is lower than the target floor and the distance between the tray 200 and the chain bracket 320 is $h_1$, the lifting chains 310 of the target floor begin to accelerate upwards (e.g. they can rise at a uniform acceleration as shown in FIG. 5), and the timekeeping for rising begins. When the height of the upper part of the chain bracket 320 is level with the height of the lower part of the tray 200 (which is determined by measuring the upper part of the tray by means of the sensor mounted on the lower part of the tray), the chain bracket 320 bears the second tray shafts 222 which protrude from the tray, the first tray shafts 221 of the tray retract (i.e. the tray 200 is detached from the lift car frame 100), and the lift car frame 100 continues to rise at a speed $V_0$. The lifting chains 310 of this target floor can continue to accelerate upward for a predetermined period of time, so that the tray 200 is disconnected from the lift car frame 100 stably.

Finally, the lifting chains 310 of the target floor decelerate such that the tray 200 is detached from the bottom of the lift car frame 100. The lifting chains 310 of the target floor decelerate until the tray 200 connected thereto stops at the floor where the lifting chains 310 are located.

In order to improve the stability during disconnection of the tray 200 from the lift car frame 100, it is also possible to make the rising speed $V_0$ of the lift car frame equal to the rising speed $V_{raise}$ of the lifting chains 310 at the time point when the tray 200 is disconnected from the lift car frame 100. As shown in FIG. 5, the lift car frame is rising at a uniform speed $V_0$, which is shown by a motion curve 9, the rising speed $V_{raise}$ of the lifting chains in the target floor is represented by a motion curve 10, and the time point when the tray 200 is stably detached from the lift car frame 100 is $t_1$. At this time point, the displacement difference between the lift car frame 100 and the lifting chains 310 is represented by the shadow A in the drawing, i.e. $h_1$ equals to the area of the shadow A. The rising distance of the lifting chains is the area of the shadow B enclosed by the motion curve 10. After the time point $t_1$, the rising speed $V_{raise}$ of the lifting chains 310 in the target floor can continue to increase and can be larger than the rising speed $V_{raise}$ of the lift car frame, so as to ensure a stable disconnection between the tray 200 and the lift car frame 100. Thereafter, the lifting chains 310 of the target floor decelerate, and therefore the tray 200 connected thereto stops at the floor where the lifting chains 310 are located. FIG. 5 merely exemplarily shows a manner for determining $h_1$ and the rising distance of the lifting chains, and it is not used to define this disclosure.

When the lifting device transports material downwards from the floor on which the material is located, such as from the fourth floor, the chain bracket 320, which is fixed on the lifting chains of the floor on which the material is located, is located at the floor on which the material is located. The specific lowering process of the lifting device for transporting material is described as bellow.

First of all, the second tray shafts 222 of the tray protrude and is carried by the chain bracket 320 that is fixed on the of the lifting chains of the floor on which the material is located, so that the detachable connection between the tray 200 and the tray circulation assembly 300 is achieved, and the lift car frame 100 is lowered at a speed $V_0$.

Figure 6:
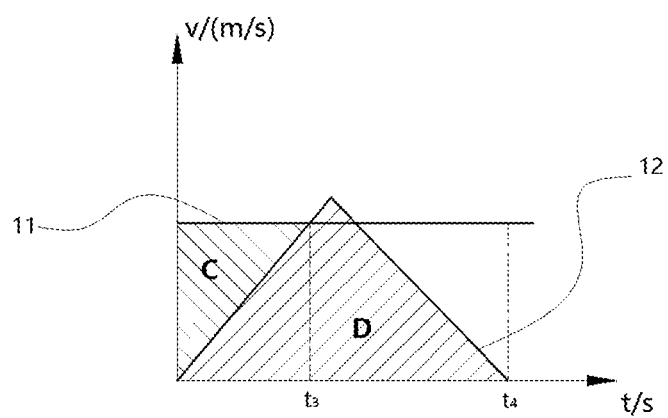
FIG. 6 is a diagram showing the motion relationship of the lifting chain of the lifting device shown in FIG. 1 during the lowering process for transporting material.

Then, when the lift car frame 100 is lowered to a level that is higher than the floor on which the material is located and when the distance between the tray 200 and the chain bracket 320 is $h_2$, the lifting chains 310 of the floor on which the material is located begin to accelerate downwards (e.g. they can be lowered in a uniform acceleration rate as shown in FIG. 6), and the timekeeping for lowering begins. When the height of the upper side of the chain bracket 320 is level with the height of the lower part of the tray 200 (which is determined by measuring the upper part of the tray by means of the sensor mounted on the lower part of the tray), the frame bracket 110 of the lift car frame bears the first tray shafts 221 protruding from the tray, and the second tray shafts 222 of the tray are in the retracting state (i.e. the tray and the lift car frame are connected with each other), the tray 200 and the lift car frame 100 continue to is lowered at a speed $V_0$. The lifting chains 310 of the target floor can continue to be lowered for a predetermined period of time, so that the tray 200 is stably disconnected from the lifting chains 310 of this target floor.

Finally, the lifting chains 310 of the floor on which the material is located decelerate until they stops. The tray 200 and the lift car frame 100 are lowered at the speed $V_0$ and finally stop at the bottom floor.

In order to improve the stability during the connection between the tray 200 and the lift car frame 100, it is possible to make the lowering speed $V_0$ of the lift car frame 100 equal to the lowering speed $V_{lower}$ of the lifting chains 310 at the time point when the tray 200 and the lift car frame 100 are connected with each other. As shown in FIG. 6, the lift car frame 100 is lowered at a uniform speed $V_0$, which is represented by the motion curve 11, the lowering speed $V_{lower}$ of the lifting chains 310 of the target floor is represented by the motion curve 12, and the time point when the tray 200 and the lift car frame 100 are connected stably is $t_3$. At this time point, the displacement difference of the lift car frame 100 and the lifting chains 310 is represented by the shadow C in the drawing, i.e. $h_2$ equals to the area of the shadow C. The lowering distance of the lifting chains 310 is the area of the shadow D enclosed by the motion curve 12. After the time point $t_3$, the lowering speed $V_{lower}$ of the lifting chains 310 of the target floor can continue to increase and can be larger than the lowering speed $V_0$ of the lift car frame, thereby ensuring a stable disconnection between the tray 200 and the lifting chains 310. Thereafter, the lifting chains 310 of the target floor decelerate and finally stop. FIG. 6 merely exemplarily shows a manner of determining $h_2$ and the lowering distance of the lifting chains, and it is not used for defining this disclosure.

Apparently, persons of ordinary skill in the art could conceive of various variations or substitutions of the embodiments of this disclosure within the technical scope revealed by this disclosure, and all these variations or substitutions shall be within the scope of protection of this disclosure. Therefore, if such modifications and variations of this disclosure belong to the scope of protection of the claims and equivalents thereof, this disclosure is intended to cover these modifications and variations.

What is claimed is:

1. A lifting device, comprising
   a lift car frame that is able to be lifted through a plurality of floors in a vertical direction,
   a tray that is detachably connected to the lift car frame,
   a tray circulation assembly that is mounted on each floor, the tray being detachably connectable to the tray circulation assembly and the tray circulation assembly being used for docking the tray connected thereto on the floor where the tray circulation assembly is mounted or for enabling the tray connected thereto to be connected to the lift car frame,
   wherein the tray comprises a tray body and first tray shafts that are retractable and fixed at edges of the tray body,
   wherein the lift car frame has a frame bracket that is connected to the first tray shafts when the first tray shafts protrude from the tray body, and is disconnected from the first tray shafts when the first tray shafts are retracted toward the tray body.

2. The lifting device according to claim 1, wherein the tray body includes second tray shafts that are retractable and fixed at the edges of the tray body,
   wherein the tray circulation assembly includes sprockets and lifting chains that are driven by the sprockets to be raised and lowered, chain brackets are fixed to the lifting chains, the chain brackets are connected to the second tray shafts when the second tray shafts protrude from the tray body, and disconnected from the second tray shafts when the second tray shafts are retracted towards the tray body.

3. The lifting device according to claim 2, wherein the first tray shafts and the second tray shafts are arranged on different edges of the tray body.

4. The lifting device according to claim 3, wherein the tray body is a square tray body, each of two opposite edges of the square tray body is provided with the first tray shafts, and each of other two opposite edges of the square tray body is provided with the second tray shafts.

5. The lifting device according to claim 4, wherein the first tray shafts and the second tray shafts are disposed axially symmetrically respectively about central axis of the square tray body.

6. The lifting device according to claim 2, wherein there are two or more second tray shafts fixed on same edge of the tray body.

7. The lifting device according to claim 2, wherein the first tray shafts and the second tray shafts employ spring-return electromagnetic switches.

8. The lifting device according to claim 2, wherein an upper surface of the chain bracket is provided with arced grooves of the chain bracket for positioning the second tray shafts.

9. The lifting device according to claim 2, wherein an upper end of the lifting chain is located between the floor where the tray circulation assembly is mounted and an upper floor, and a lower end of the lifting chain is located between the floor where the tray circulation assembly is mounted and a lower floor.

10. The lifting device according to claim 1, wherein there are two or more first tray shafts fixed on same edge of the tray body.

11. The lifting device according to claim 1, wherein the lift car frame and the tray circulation assembly are driven by different electric motor.

12. The lifting device according to claim 1, wherein the lift car frame is provided with a plurality of layers of frame brackets from bottom to top.

13. The lifting device according to claim 1, wherein an upper surface of the frame bracket is provided with arced grooves of the frame bracket for positioning the first tray shafts.

14. A method of operating a lifting device, wherein the lifting device comprises a lift car frame that is able to be lifted through a plurality of floors in vertical direction, a tray that is detachably connected to the lift car frame, a tray circulation assembly that is mounted on each floor, the tray being detachably connectable to the tray circulation assembly, the method comprising:
before the lift car frame is raised or lowered to the tray circulation assembly, accelerating the tray circulation assembly in the same direction as the lift car frame,
when the tray circulation assembly is level with a height of the tray, performing at least one of:
disconnecting the tray from the lift car frame and connecting the tray to the tray circulation assembly, and docking, by the tray circulation assembly, the tray connected thereto on the floor where the tray circulation assembly is mounted, or
disconnecting the tray from the tray circulation assembly and connecting the tray to the lift car frame such that the tray is capable of being raised or lowered with the lift car frame.

15. The operating method according to claim 14, wherein the lift car frame is raised or lowered at a uniform speed.

16. The operating method according to claim 14, wherein an acceleration of the tray circulation assembly during accelerating is constant.

17. The operating method according to claim 14, wherein when the tray circulation assembly is level with the height of the tray, the tray circulation assembly has the same speed as the lift car frame.

18. The operating method according to claim 14, wherein after the tray circulation assembly is level with the height of the tray, the tray circulation assembly continues to accelerate for a predetermined period of time.

* * * * *